United States Patent
Starr et al.

(10) Patent No.: US 6,203,117 B1
(45) Date of Patent: Mar. 20, 2001

(54) COMPENSATOR ASSEMBLY IN A HYDRAULIC CONTROL UNIT FOR VEHICULAR BRAKE SYSTEMS

(75) Inventors: Joseph A. Starr, Plymouth; Ronald L. Sorenson, Erie, both of MI (US)

(73) Assignee: Kelsey-Hayes Corporation, Livonia, MI (US)

( * ) Notice: Subject to any disclaimer, the term of this patent is extended or adjusted under 35 U.S.C. 154(b) by 0 days.

(21) Appl. No.: 09/174,870

(22) Filed: Oct. 19, 1998

Related U.S. Application Data

(60) Provisional application No. 60/062,587, filed on Oct. 20, 1997.

(51) Int. Cl.[7] .................................................. B60T 17/08
(52) U.S. Cl. ................. 303/87; 303/119.4; 303/DIG. 11; 138/31
(58) Field of Search .............................. 303/115.1, 115.4, 303/87, DIG. 11, 119.4; 60/566, 586, 584, 592; 138/30, 31

(56) References Cited

U.S. PATENT DOCUMENTS

| | | |
|---|---|---|
| 3,140,124 | 7/1964 | Heiland . |
| 4,217,758 * | 8/1980 | Bach et al. ............................ 60/404 |
| 4,769,990 * | 9/1988 | Bach et al. ............................ 60/416 |
| 5,035,469 | 7/1991 | Geilen et al. . |
| 5,096,400 | 3/1992 | Budecker et al. . |
| 5,209,554 | 5/1993 | Beilfuss et al. . |
| 5,215,359 * | 6/1993 | Burgdorf et al. ................. 303/115.4 |
| 5,538,334 * | 7/1996 | Kushi et al. ....................... 303/113.5 |
| 5,567,128 * | 10/1996 | Volz et al. ............................ 417/313 |
| 5,628,550 * | 5/1997 | Zaviska et al. ................... 303/115.4 |
| 5,673,978 * | 10/1997 | Linkner, Jr. ............................ 303/87 |
| 5,741,049 * | 4/1998 | Sorenson .............................. 303/9.75 |
| 5,921,636 * | 7/1999 | Roberts ................................ 303/87 |
| 5,941,277 * | 7/1999 | Vogel .............................. 137/505.42 |

FOREIGN PATENT DOCUMENTS

| | | |
|---|---|---|
| 40 39 088 | 6/1992 | (DE) . |
| 0 491 159 | 11/1991 | (EP) . |
| 2 036 222 | 6/1980 | (GB) . |
| 011 06 759 | 4/1989 | (JP) . |
| 100 24 824 | 1/1998 | (JP) . |

* cited by examiner

Primary Examiner—Robert J. Oberleitner
Assistant Examiner—Bradley King
(74) Attorney, Agent, or Firm—MacMillan, Sobanski & Todd, LLC

(57) ABSTRACT

A hydraulic control unit of an electronically-controlled vehicular brake system includes a housing having a bore. The bore is in fluid communication with a first fluid passage leading to an outlet of a pump. The bore is also in fluid communication with a second fluid passage leading to a master cylinder. A retainer cap is mounted in the bore. A piston is slidably received in the retainer cap. The piston includes a fluid channel providing fluid communication between the first and second fluid passages. A spring is positioned between the retainer cap and the piston to urge the piston from the retainer cap. A check valve assembly is mounted in the fluid channel of the piston that permits only one-way fluid flow from the first fluid passage to the second fluid passage. The compensator assembly provides a controlled amount of additional displacement of a master cylinder piston when the brake system is operating in an electronically activated mode only.

13 Claims, 3 Drawing Sheets

COMPENSATOR ASSEMBLY IN A HYDRAULIC CONTROL UNIT FOR VEHICULAR BRAKE SYSTEMS

This application claims benefit to U.S. provisional application Ser. No. 60/062,587, filed Oct. 20, 1997.

BACKGROUND OF THE INVENTION

This invention relates in general to electronically-controlled vehicular brake systems, and in particular is concerned with a compensator assembly mounted in a hydraulic control unit to accommodate travel of a master cylinder piston.

Electronically-controlled hydraulic brake systems for vehicles are well known. Such systems typically include a hydraulic control unit (HCU) hydraulically connected between a master cylinder and wheel brakes. The master cylinder generates hydraulic forces in the brake circuit by pressurizing brake fluid when the driver steps on the brake pedal. A piston in the master cylinder travels in response to the brake pedal. The pressurized fluid travels through the fluid conduit in the circuit to actuate brake cylinders at the wheel brakes and slow the vehicle.

The hydraulic control unit contains control valves and other components such as a pump. Through an electronic controller, the control valves and other components selectively control pressure to the wheel brake assemblies to provide a desired braking response of the vehicle, such as anti-lock braking, traction control, and vehicle stability control.

The master cylinder includes a piston having at least one annular seal. Preferably, this seal is formed as a one-way seal commonly known as a lip seal. During a braking event, this seal can rest adjacent a comp port of the master cylinder. Fluid from the comp port tends to flap the seal back and forth, which can result in deterioration of the seal and premature failure. Known braking systems can provide additional displacement of the master cylinder piston to move the seal away from the comp port, but such systems add extra pedal stroke to every braking event, i.e., normal (base) braking as well as anti-lock braking. Additional pedal stroke is generally not desired in many braking systems.

SUMMARY OF THE INVENTION

This invention relates to a compensator assembly mounted in a hydraulic control unit of electronically-controlled vehicular brake systems. The compensator assembly permits additional displacement of a master cylinder piston during electronically-activated braking events (such as anti-lock braking) only. The additional displacement moves a seal mounted on the master cylinder piston away from a comp port, thereby preventing repeated flapping of the seal which can cause premature seal failure. An advantage this compensator assembly is that additional pedal stroke is not present during normal base braking, since this compensator assembly has no effect during normal braking. The compensator assembly is mounted in a hydraulic control unit and can be used with many electronically-controlled brake systems.

In a preferred embodiment, a hydraulic control unit of an electronically-controlled vehicular brake system includes a housing having a bore. The bore is in fluid communication with a first fluid passage leading to an outlet of a pump. The bore is also in fluid communication with a second fluid passage leading to a master cylinder. A retainer cap is mounted in the bore. A piston is slidably received in the retainer cap. The piston includes a fluid channel providing fluid communication between the first and second fluid passages. A spring is positioned between the retainer cap and the piston to urge the piston from the retainer cap. A check valve assembly is mounted in the fluid channel of the piston that permits only one-way fluid flow from the first fluid passage to the second fluid passage. The compensator assembly provides a controlled amount of additional displacement of a master cylinder piston when the brake system is operating in an electronically activated mode only.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
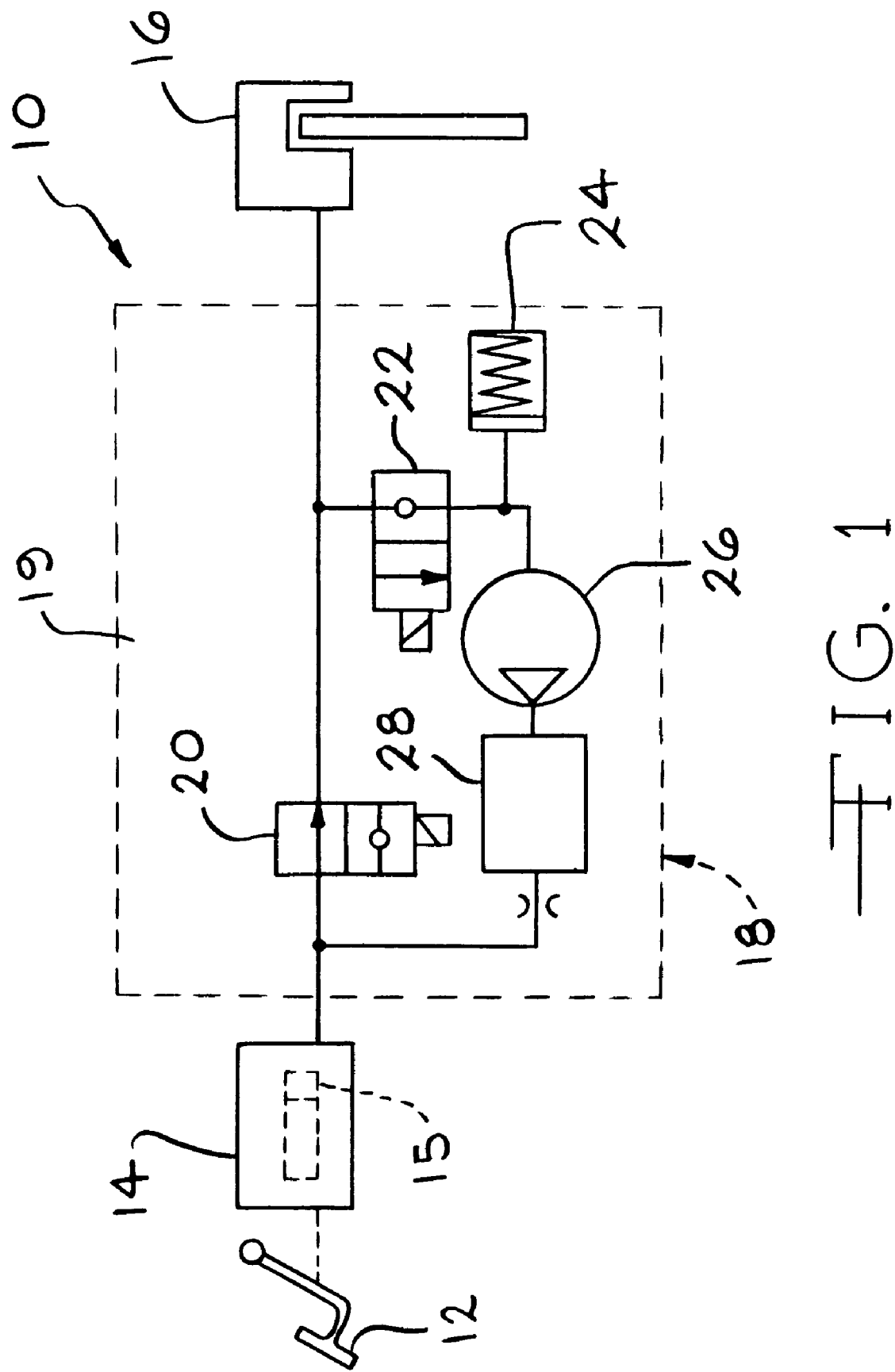
FIG. 1 is a schematic diagram of an electronically-controlled vehicular brake system according to this invention illustrating only one set of components housed in a hydraulic control unit.

An electronically controlled vehicular brake system according to this invention is indicated generally at 10 in FIG. 1. The system 10 includes control valves and other components described below to provide an anti-lock braking function. In other embodiments, the system 10 can also include components to provide other desired functions such as traction control and vehicle stability control.

The system 10 includes a brake pedal 12 is connected to a master cylinder 14 to provide pressurized brake fluid to a wheel brake 16. In the embodiment illustrated in FIG. 1, the wheel brake 16 is illustrated as a disc brake assembly. In other embodiments, the wheel brake 16 may be any type of wheel brake.

The master cylinder 14 includes a well known piston 15 reciprocally mounted in a housing that moves in response to application of the brake pedal 12. The master cylinder piston 15 includes seals that separate fluid in the housing into various chambers.

Figure 2:
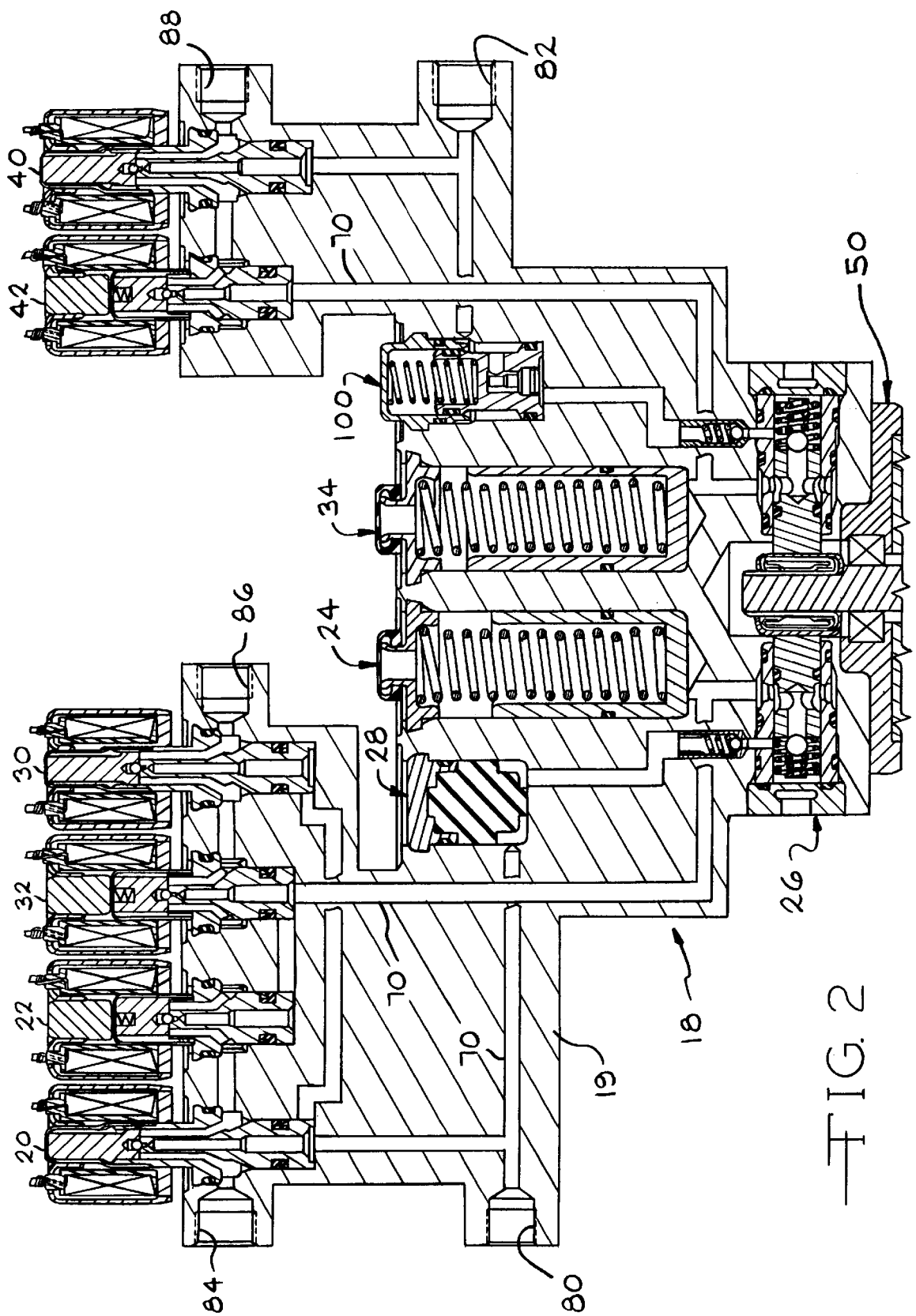
FIG. 2 is a sectional representation through the hydraulic control unit of FIG. 1 illustrating three sets of components in the system and including a compensator assembly.

A hydraulic control unit (HCU) 18 is a housing 19 having bores for receiving control valves and other components described below. Fluid conduits are provided between the bores to provide fluid communication between the valves and other components. For purposes of clarity of illustration, only one set of components is illustrated in the schematic diagram of FIG. 1. However, as shown in FIG. 2, the HCU 18 includes components for other circuits and/or wheels of the vehicle. An electronic control module or unit (not illustrated) receives signals from sensors and activates the components to provide a desired braking function.

The HCU 18 includes a normally open control valve 20, commonly known as an isolation valve, and a normally closed control valve 22, commonly known as a dump valve, disposed between the master cylinder 14 and the wheel brake 16. A low pressure accumulator 24 is disposed between the dump valve 22 and a hydraulic pump 26. An attenuator 28 is disposed between an output of the hydraulic pump 26 and an inlet to the isolation valve 20 to limit and smooth the fluid flow from the output of the pump 26 back to the master cylinder 14. The isolation valve 20 is preferably formed as a proportional solenoid valve switchable between two positions. The dump valve 22 is preferably formed as a solenoid valve switchable between two positions. Valves 20 and 22, as well as pump 26, are electrically connected to an electronic control module and operated to provide desired system braking in a well known manner.

A schematic sectional view of the HCU 18 is presented in FIG. 2. In this embodiment, the HCU 18 is configured for a three channel ABS hydraulic braking system. In other embodiments of the HCU 18, a four channel system can be provided, and additional components can be added to provide functions such as traction control and vehicle stability control.

The housing 19 includes bores for receiving isolation valves 20, 30, and 40 disposed between the master cylinder 14 and respective wheel brakes (not illustrated in FIG. 2). The housing 19 also includes bores for receiving dump valves 22, 32, and 42. All of the isolation and dump valves are preferably solenoid actuated control valves electrically connected to an electronic control unit (not illustrated).

Low pressure accumulators 24 and 34 are received in respective bores in the housing 19. The reciprocating pump 26 is driven by an electric motor 50 (only partially illustrated in FIG. 2) in a well known manner. A compensator assembly 100, discussed in detail below, is received in a respective bore in the housing 19.

The above-referenced valves and other components mounted in the housing 19 are connected by fluid passageways 70 formed in the housing 19. Hydraulic fluid is supplied to the HCU 18 from the master cylinder 14 at inlets 80 and 82. Hydraulic fluid is routed to wheel brakes at outlets 84, 86, and 88.

Figure 3:
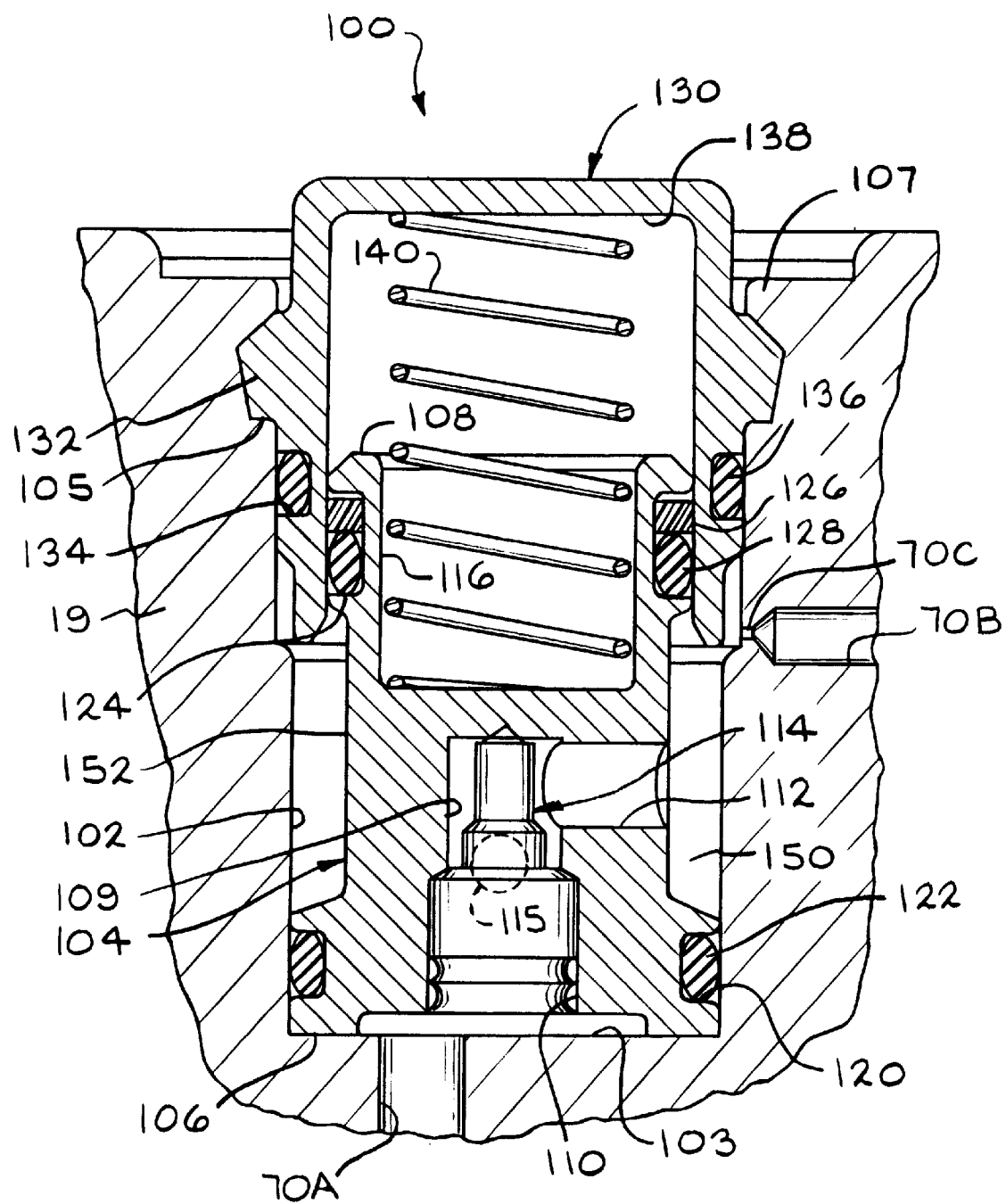
FIG. 3 is an enlarged sectional view of the compensator assembly illustrated in FIG. 2.

The compensator assembly 100 is illustrated in detail in the enlarged sectional view of FIG. 3. The compensator assembly 100 accommodates additional displacement of the master cylinder piston 15 during electronically activated braking (such as anti-lock braking in the illustrated embodiment) only, thereby moving seals of a master cylinder piston 15 away from a comp port of the master cylinder 14.

The compensator assembly 100 is mounted in the housing 19. A stepped bore 102 is formed in the housing 19 that terminates in an end wall 103. As described below, the compensator assembly 100 is received and retained in the bore 102.

A generally cylindrical piston 104 includes an inner end 106 and an outer end 108. A fluid channel 109 is formed through the piston 104 to permit fluid flow as described below. Preferably, the fluid channel 109 includes an axial passage 110 provided at the inner end 106 and a side passage 112 formed in the piston 104 in fluid communication with the axial passage 110. Preferably, the side passage 110 perpendicularly intersects the axial passage 110.

A check valve assembly 114 is inserted into the fluid channel 109 to permit flow in only one direction from the outlet of the pump 26 to the master cylinder 14. Fluid in the opposite direction is checked or blocked. The check valve assembly 114 can include an internal ball 115 that is normally engaged in a seat (not illustrated in FIG. 3.) by a spring (not illustrated in FIG. 3) to check fluid flow. Preferably, the check valve assembly 114 is retained in the fluid channel 109 by an interference fit.

A second axial cavity 116 is provided at the outer end 108 of the piston 104. The axial cavity 116 receives a spring as described below.

A circumferential groove 120 is formed near the inner end 106. A seal 122, preferably a compressible O-ring, is received in the groove 120. A circumferential groove 124 is formed near the outer end 108. A backup ring 126 and a seal 128, preferably a compressible O-ring, are received in the groove 124. Preferably, the backup ring 126 is positioned closest to the outer end 108. The backup ring 126 is formed from a low-friction material, preferably polytetraflouroethylene.

A cup-shaped retainer cap 130 slidably receives the piston 104. The retainer cap 130 includes an annular flange 132 that is seated on a landing 105 of the bore 102. A circumferential groove 134 is formed about the retainer cap 130 inboard of the flange 132. A seal 136, preferably a compressible O-ring, is received in the groove 134.

A spring 140, preferably a coil spring, is positioned between the piston 104 and the retainer cap 130 to urge the piston 104 away from the retainer cap 130. The spring 140 is seated at a first end in the axial cavity 116 of the piston 104 and at an opposite end on an inner surface 138 of the retainer cap 130. In the uncompressed condition, the backup ring 126 and the O-ring 128 engage an inner surface of the retainer cap 130.

After the piston 104 is slidably received in the retainer cap 130, the retainer cap 130 is inserted into the bore 102 until the flange 132 engages the landing 105. Material of the housing 19 surrounding the bore 104 is deformed to form a preferably annular lip 107 to retain the assembly 100 in the housing 19. The lip 107 can be formed by any desired means including swaging.

The axial passage 110 is in fluid communication with a fluid passage 70A in the housing 19 in fluid communication with the outlet of the pump 26. The side passage 112 is in fluid communication with a second fluid passage 70B formed in the housing 19 in fluid communication with the master cylinder 14. A restricted orifice 70C is provided between the bore 102 and second fluid passage 70B. In other embodiments, a restricted orifice can be formed in the side passage 112. As described below, fluid can travel from the first fluid passage 70A through the compensator assembly 100 to reach the second fluid passage 70B, but not in the opposite direction.

An annular fluid chamber 150 is formed between the bore 102 and a circumferential undercut 152 formed on the outer surface of the piston 104. The annular chamber 150 is in fluid communication with the orifice 70C via a clearance between the retainer cap 130 and the bore 102. The length of the undercut 152 is such that the annular chamber 150 is always in fluid communication with the orifice 70C throughout the travel of the piston 104.

When the system 10 is operating in normal braking (i.e., not an ABS or other electronically-activated event), the compensator assembly 100 has no effect on the system 10 as fluid from the master cylinder 14 is blocked by the check valve 114. Thus, stroke of pedal 12 is not affected by the compensator assembly 100.

When the system 10 is operating in an ABS or other electronically-activated mode, i.e., when the pump 26 is operating, the compensator assembly 100 permits the piston 15 of the master cylinder 14 to continue to travel, thereby moving a seal of a master cylinder piston 15 away from a comp port. As the pump 26 forces fluid through passage 70A, the piston 104 is urged toward the retainer cap 130, thereby compressing the spring 140. As the spring 140 is compressed and the piston 104 moves upwardly, fluid from the pump 26 is temporarily stored in the HCU 18, and not routed to the master cylinder 14. When the pump 26 stops operating, the spring 140 urges the piston 104 downwardly to its original position. Backup ring 126 provides a low-friction surface as the piston 104 reciprocates.

Displacement of the piston 104 toward the retainer cap 130 permits additional displacement of a master cylinder piston 15. This additional displacement moves a seal away from a comp port. Thus, the seal is not subjected to fluid flow at the comp port that tends to flap the seal back and forth, causing premature failure of the seal.

The check valve assembly 114 will open at a predetermined pressure and permit fluid to pass through the orifice 70C. Such fluid travels to the master cylinder 14 through passage 70B. However, this fluid is damped by the compensator assembly 100 and does not damage seals about the piston 15 of the master cylinder 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A hydraulic control unit of an electronically-controlled vehicular brake system comprising:
   a housing including a bore, wherein the bore is in fluid communication with a first fluid passage leading to an outlet of a pump, and wherein the bore is in fluid communication with a second fluid passage leading to a master cylinder;
   a restricted orifice formed between the bore and the second fluid passage;
   a retainer cap mounted in the bore;
   a piston slidably received in the retainer cap, the piston including a fluid channel providing fluid communication between the first and second fluid passages;
   a spring positioned between the retainer cap and the piston to urge the piston from the retainer cap; and
   a check valve assembly mounted in the fluid channel of the piston that permits only one-way fluid flow from the first fluid passage to the second fluid passage, wherein the check valve assembly includes a check ball.

2. The hydraulic control unit specified in claim 1 wherein the fluid channel includes an axial passage intersected by a side passage.

3. The hydraulic control unit specified in claim 2 wherein the side passage perpendicularly intersects the axial passage.

4. The hydraulic control unit specified in claim 2 wherein the piston includes an annular undercut formed in its outer surface which cooperates with the bore of the housing to form an annular fluid chamber.

5. The hydraulic control unit specified in claim 4 wherein the side passage intersects the undercut.

6. The hydraulic control unit specified in claim 4 wherein the undercut has a predetermined length so that the annular fluid chamber is in fluid communication with the second fluid passage at all positions of the piston.

7. A hydraulic control unit of an electronically-controlled vehicular brake system comprising:
   a housing including a bore, wherein the bore is in fluid communication with a first fluid passage leading to an outlet of a pump and a second fluid passage leading to a master cylinder, and wherein the bore is only in fluid communication with the first and second fluid passages;
   a retainer cap mounted in the bore;
   a piston slidably received in the retainer cap, the piston including an internal fluid channel providing fluid communication between the first and second fluid passages;
   a spring positioned between the retainer cap and the piston to urge the piston from the retainer cap;
   a check valve assembly mounted in the internal fluid channel of the piston that permits only one-way fluid flow from the first fluid passage to the second fluid passage; and
   an annular undercut formed in an outer surface of the piston that cooperates with the bore of the housing to form an annular fluid chamber, wherein the undercut has a predetermined length so that the annular fluid chamber is in fluid communication with the second fluid passage at all positions of the piston.

8. The hydraulic control unit specified in claim 7 including a restricted orifice formed between the bore in the housing and the second fluid passage.

9. An electronically-controlled vehicular brake system comprising:
   a master cylinder;
   a wheel brake;
   a hydraulic control unit connected in fluid communication between the master cylinder and the wheel brake, the hydraulic control unit including a housing have a bore and a pump; and
   a compensator assembly mounted in the bore and in fluid communication with an outlet of the pump and the master cylinder, the compensator assembly including
      a retainer cap mounted in the bore,
      a piston slidably received in the retainer cap, the piston including an internal fluid channel providing fluid communication between the pump outlet and the master cylinder and an annular undercut formed in an outer surface of the piston that cooperates with the bore of the housing to form an annular fluid chamber, wherein the undercut has a predetermined length so that the annular fluid chamber is in fluid communication with the master cylinder at all positions of the piston,
      a spring positioned between the retainer cap and the piston to urge the piston from the retainer cap, and
      a check valve assembly mounted in the internal fluid channel of the piston that permits only one-way fluid flow from the pump outlet to the master cylinder, wherein the compensator assembly provides means for allowing a controlled amount of additional travel for a piston in the master cylinder when the brake system is operating in an electronically activated mode only.

10. The vehicular brake system specified in claim 9 including a restricted orifice formed between the bore in the hydraulic control unit and the master cylinder.

11. An electronically-controlled vehicular brake system comprising:
   a master cylinder;
   a wheel brake;
   a hydraulic control unit connected in fluid communication between the master cylinder and the wheel brake, the hydraulic control unit including a housing have a bore and a pump; and
   a compensator assembly mounted in the bore and in fluid communication with an outlet of the pump and the master cylinder, the compensator assembly including a retainer cap mounted in the bore, a piston slidably received in the retainer cap, the piston including a fluid channel providing fluid communication between the pump outlet and the master cylinder and an annular undercut formed in an outer surface of the piston that cooperates with the bore of the housing to form an annular fluid chamber, wherein the undercut has a predetermined length so that the annular fluid chamber is in fluid communication with the master cylinder at all positions of the piston, a spring positioned between the retainer cap and the piston to urge the piston from the retainer cap, and a check valve assembly mounted in the fluid channel of the piston that permits only one-way fluid flow from the pump outlet to the master cylinder, wherein a volume of brake fluid is temporarily stored in the compensator assembly when an electronically activated mode ends.

12. The vehicular brake system specified in claim 11 including a restricted orifice formed between the bore in the hydraulic control unit and the master cylinder.

13. An electronically-controlled vehicular brake system comprising:

a master cylinder;

a wheel brake;

a hydraulic control unit connected in fluid communication between the master cylinder and the wheel brake, the hydraulic control unit including a housing have a bore;

a pump mounted on the hydraulic control unit;

a compensator assembly mounted in the bore in fluid communication with the pump, the compensator assembly including a retainer cap mounted in the bore, a piston slidably received in the bore, the piston including an annular undercut formed in an outer surface of the piston that cooperates with the bore of the housing to form an annular fluid chamber, wherein the undercut has a predetermined length so that the annular fluid chamber is in fluid communication with the master cylinder at all positions of the piston, and a spring positioned between the retainer cap and the piston to urge the piston from the retainer cap, wherein the compensator assembly provides means for allowing a controlled amount of additional travel for a piston in the master cylinder when the brake system is operating in an electronically activated mode only.

\* \* \* \* \*